March 7, 1939. W. T. KELLEY 2,150,067
HIVE FRAME
Filed Nov. 8, 1938
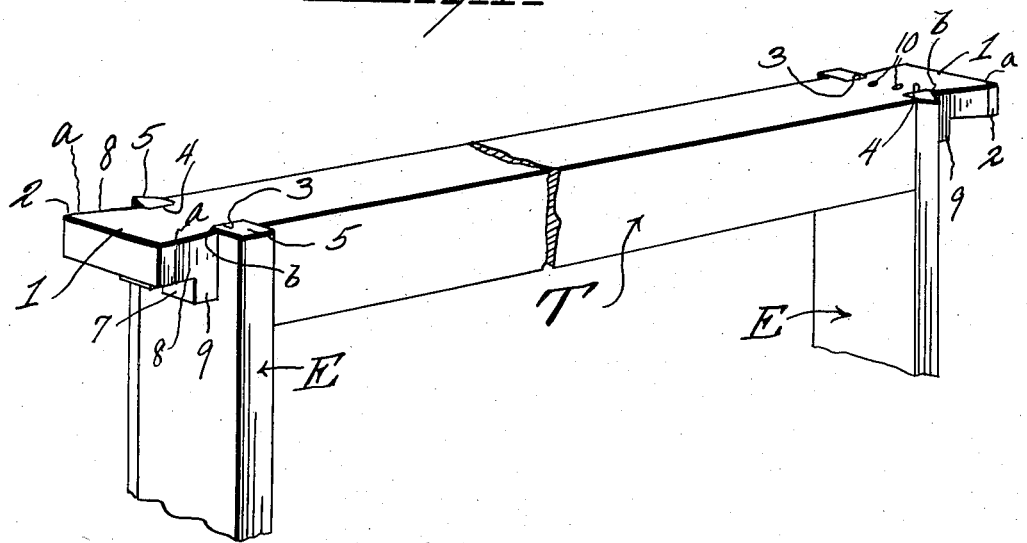
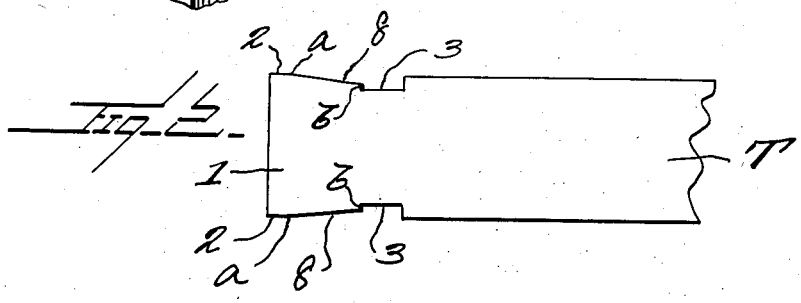
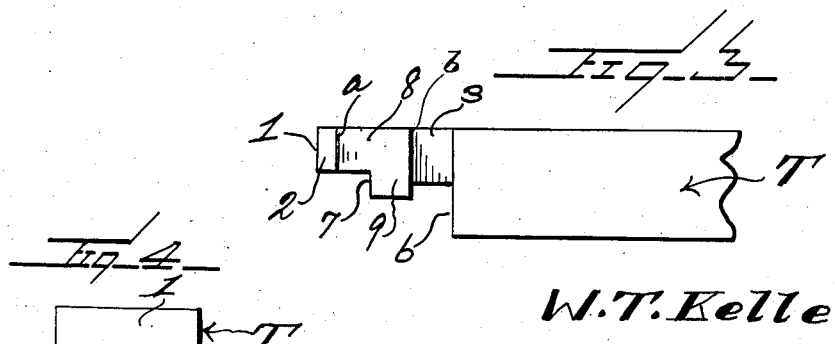
Inventor
W. T. Kelley
By Watson E. Coleman
Attorney Patented Mar. 7, 1939

2,150,067

UNITED STATES PATENT OFFICE 2,150,067

HIVE FRAME

Walter T. Kelley, Paducah, Ky.

Application November 8, 1938, Serial No. 239,544

2 Claims. (Cl. 6—10)

This invention relates to a hive frame and has relation more particularly to the top bar thereof.

It is an object of the invention to provide a hive frame provided with a top bar having projecting or overhanging end portions so constructed and arranged to provide effective means for handling the frame whereby liability of the frame slipping out of the hands of the beekeeper is substantially eliminated.

In all apiary work it is the usual and common practice to handle the hive frames by the top bar extensions or projections and when a frame is set on the ground or lowered into an extractor, the frame is lowered and set down on end. It is another object of the invention to have the projecting or extending extremities of the top bar each formed into what may be termed a "reversed wedge" to facilitate the gripping action of the beekeeper therewith.

In extracting honey from the uncapped combs contained in a hive frame, the beekeeper must lower the frame into the extractor basket, pocket, etc. on end with, of course, the top bar vertically disposed. It is the general practice of the beekeeper during such operation to grasp the projected or extended extremity of the top bar. Due to the uncapping of the honey comb, the handling of the extracted honey, and other operations, the frame and the hands of the beekeeper become smeared with honey. This honey, acting as a lubricant, often causes the beekeeper to lose his grip on the top bar extensions or projections that have heretofore been used resulting in the frame, which when filled with honey weighs as much as ten pounds, to slip from the grasp of the beekeeper causing damage to the frame, the honey comb, the extractor basket or pocket, etc. An additional object of the invention is to provide a frame wherein these disadvantages are avoided.

The invention consists in the details of construction and in the combination and arrangement of the several parts of my improved hive frame whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in perspective illustrating a top bar for a hive frame constructed in accordance with an embodiment of my invention;

Figure 2 is a fragmentary view in top plan of an end portion of the top bar as herein disclosed;

Figure 3 is a fragmentary view in side elevation of the top bar as illustrated in Figure 2;

Figure 4 is a view in end elevation of the top bar as herein comprised.

As disclosed in the accompanying drawing, T denotes a top bar comprised in the structure of a frame adapted to be received within a hive. This bar T at each extremity is provided in its upper part with an outwardly disposed extension or projection 1, the top face of which is flush with the top face of the bar proper and the outer end portion of which, as at 2, is of substantially the same width as the width of the bar T proper. This extension 1 is of a thickness approximating one-half the thickness of the top bar T as disclosed in the accompanying drawing although I do not wish to be understood as limiting myself to this exact proportion.

The side faces of the extension or projection 1 immediately adjacent to the bar T are provided thereacross with the notches 3. The inner portion of the extension or projection 1 is received within a bifurcation 4 provided in the upper end portion of the associated end bar E of the frame with the inner marginal portions of the forks 5 of the end bar E snugly engaging within the notches 3 and with the portion of the end bar E immediately below the bifurcation 4 having close contact with the end 6 of the top bar T immediately below the extension or projection 1.

The outer side walls of the notches 3 are defined by a transversely disposed depending flange 7 formed with the extension 1 and which flange has contact from without with the outer face of the adjacent end bar E immediately below the kerf or bifurcation 4, thus assuring a strong connection or joining of an end portion of the top bar T with an end bar E.

The side faces of the extension or projection 1 at a point $a$ spaced a slight distance inwardly of the outer end of the extension or projection, are inwardly and rearwardly tapered, as at 8, to a point $b$ approximately midway of the depths of the notches 3. The adjacent end faces 9 of the flange 7 are similarly tapered or beveled and flush with the tapered edge faces 8.

In the production of a top bar T the grain of the wood runs lengthwise thereof and by having the outer end portion 2 of the extension or projection 1 in advance of the tapered portions 8 flat or flush with the side faces of the bar T, clipping off of the outer corners of the extension or projection 1 is eliminated in the various manipulations of the frame. This is of importance as the strength of the top bar will not be affected.

It is believed to be apparent that the particular construction of the end portion of the bar T, or more particularly the extensions or projections 1 thereof, is such that each of said extensions or projections is in the form of a reversed wedge with respect to the bar T proper.

It is the general practice of the beekeeper in handling a frame to grasp the same by an extension or projection of the top bar and when such extension or projection as well as the hands of the beekeeper are covered with honey, there is a tendency for the projection or extension to readily slip from the grasp of the beekeeper. However, this disadvantage is substantially eliminated by this reversed wedge form of each of the extensions or projections 1 as such formation not only provides effective resistance against slippage but results in a tightening of the grip as a result of the weight of the frame and its load.

Any means desired may be employed for anchoring the top bar T to the end bars E but, as herein disclosed, headed members 10 are driven through the inner portions of the extensions or projections 1 into the end bars E.

From the foregoing description it is thought to be obvious that a hive frame constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A frame for a bee hive including a top bar for coaction with the end bars of the frame, said top bar being provided at its opposite ends with extensions, the side faces of the extensions having portions disposed inwardly and rearwardly on an incline.

2. A frame for a bee hive including a top bar having extensions at the opposite ends thereof, the side faces of the extensions immediately adjacent to the bar proper being provided thereacross with notches to allow the top bar to interlock with the end bars of the frame, the side faces of the extensions being inwardly and rearwardly inclined from the outer end portions of the extensions to the notches.

WALTER T. KELLEY.